United States Patent [19]
Hadi Ali et al.

[11] Patent Number: 4,740,359
[45] Date of Patent: * Apr. 26, 1988

[54] PROCESS FOR THE RECOVERY OF URANIUM VALUES IN AN EXTRACTIVE REPROCESSING PROCESS FOR IRRADIATED NUCLEAR FUELS

[75] Inventors: Sameh A. Hadi Ali, Ettlingen; Juergen Haag, Worms, both of Fed. Rep. of Germany

[73] Assignee: Kernforschungszentrum Karlsruhe GmbH, Karlsruhe, Fed. Rep. of Germany

[ * ] Notice: The portion of the term of this patent subsequent to Sep. 29, 2004 has been disclaimed.

[21] Appl. No.: 762,363

[22] Filed: Aug. 5, 1985

[30] Foreign Application Priority Data

Aug. 4, 1984 [DE] Fed. Rep. of Germany ....... 3428878

[51] Int. Cl.$^4$ ............................................ C01G 43/00
[52] U.S. Cl. ............................................ 423/7; 423/2; 423/17
[58] Field of Search ................................ 423/2, 7, 17

[56] References Cited

U.S. PATENT DOCUMENTS

| | | | |
|---|---|---|---|
| 2,811,412 | 10/1957 | Poirier | 423/7 |
| 3,155,455 | 11/1964 | Hart | 423/7 |
| 3,835,044 | 9/1974 | Schulz | 423/7 |
| 3,864,667 | 12/1958 | Bailes et al. | 423/7 |
| 3,922,231 | 11/1975 | Carlin et al. | 423/2 |
| 4,280,985 | 7/1981 | Yan | 423/7 |
| 4,460,547 | 7/1984 | Sameh et al. | 423/7 |

FOREIGN PATENT DOCUMENTS 0170796  2/1986  European Pat. Off. ................ 423/7

*Primary Examiner*—Edward A. Miller
*Attorney, Agent, or Firm*—Sughrue, Mion, Zinn, Macpeak, and Seas

[57] ABSTRACT

An organic extraction phase, containing fission materials uranium and plutonium, as well as a minor amount of fission- and corrosion-products, from an extraction step or from a purification step of a nuclear fuel reprocessing process is treated with an aqueous, basic, carbonate ion containing solution, whereby the fission materials and at least a part of the fission- and corrosion-products are stripped into the aqueous phase and the uranium is present in the form of uranium-carbonato-complex. The organic phase is then separated from the aqueous phase. Plutonium is then removed from the separated aqueous phase. The remaining aqueous solution containing the uranium-carbonato-complex and a small residual amount (C) of fission products is adjusted to a ratio of uranyl ion concentration to carbonate ion- or $CO_3^{--}/HCO_3^{--}$ concentration of $1(UO_2^{++})$ to $4.5(CO_3^{--}$ or $CO_3^{--}/HNO_3^{-})$, respectively, or more, at a maximum U-concentration of not more than 6- g/l. The adjusted solution is then led over a basic anion exchanger made from a polyalkene matrix provided with a preponderant part tertiary and a minor part quaternary amino groups to adsorb fission product ions or fission products containing ions. The unadsorbed uranyl-carbonato complex which is now decontaminated, and preponderantly fission product free is recovered by separating the uranium containing, remaining aqueous solution from the ion exchanger.

8 Claims, No Drawings

PROCESS FOR THE RECOVERY OF URANIUM VALUES IN AN EXTRACTIVE REPROCESSING PROCESS OF OR IRRADIATED NUCLEAR FUELS

BACKGROUND OF THE INVENTION

The present invention relates to a process for the recovery of uranium values in an extractive reprocessing process for irradiated nuclear fuels.

Until now, in order to recycle irradiated nuclear fuels, nuclear reactor fuel elements were dissolved, for example, in nitric acid, and the uranium separated by liquid/liquid extraction, as, for example, in the Purex process, or by amine extraction, or by column chromatography separation operations, and reprocessed in a nitric acid medium.

The nitric acid recycling of nuclear fuels constituted mainly of $UO_2$, especially the Purex process, is a reliable process that has been known for a long time. After reaching the pre-determined length of operation or the desired burn-up, respectively, the fuel elements to be replaced are removed from the nuclear reactor and submitted, for example, to a one to three year storage for the cooling of the shorter lived fission products. Only after this storage duration are the fuel elements transported to the reprocessing installation and there divided into relatively small pieces, from which the remaining fission materials and the resultant fission products, etc., are dissolved out with strong nitric acid. The aqueous fuel solution thereby obtained is then diluted and fed into the first column of the first extraction cycle of the process. In the first extraction column, in counter current to the aqueous fuel solution, an organic extraction solution generally comprised of an organic extractant agent and an organic diluent agent is fed to extract or convert to an organic phase the fission materials uranium and plutonium, as well as smaller amounts of other actinides and small amounts of fission products. The aqueous, nitric acid run-off from the extraction column, now containing only very small amounts of uranium and plutonium, contains the main amount of fission products, corrosion products, etc., and represents a highly radioactive waste solution. After washing the organic phase with diluted nitric acid, the plutonium is treated with an aqueous stripping solution and transferred with simultaneous reduction of the oxidation state of the plutonium selectively from the organic phase into the aqueous phase. Then, the uranium still remaining in the organic phase (the main amount of the fission materials) is likewise transferred into an aqueous stripping solution. The aqueous solutions of uranium and plutonium are now further processed separately, for example, by means of two further purification cycles each, in order to be decontaminated as thoroughly as possible from the fission products as well.

Although this process method dominates for long irradiated and relatively long cooled fuel elements and can be safely carried out within suitable process conditions, it does have several disadvantages. For example, additional aqueous waste streams are obtained from the first extraction column at different places in addition to the highly radioactive waste solution, which contain radioactive fission products, etc. These waste streams must be concentrated and led either to further processing or to solidification. Moreover, small amounts of fission material can escape from the product streams of the process by the formation of degradation products from the extraction agents, whereby the degradation products form strong bonds with small amounts of fission materials and reach the aqueous waste streams.

SUMMARY OF THE INVENTION

An object of the present invention is to create a process with which, in an extractive reprocessing process for irradiated nuclear fuels, and in a process step after dissolving the nuclear fuel, uranium values from an organic extraction solution containing plutonium and fission- and corrosion-products are transferred into an aqueous phase at any suitable place of the process, and can be separated from plutonium and from the fission- and corrosion-products in a simple way with a relatively high degree of decontamination.

Another object of the present invention is to provide such a process which can be suitable in the Purex process, in the first extraction cycle as well as in another uranium extraction and/or purification cycle.

A still further object of the present invention is to provide such a process which is also suitable for use in extraction processes other than the Purex process (for example a process which used quaternary amines or a process which used column chromatography separation operations), by which uranium values are to be recovered.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a process for recovering uranium values in an extractive reprocessing process for irradiated nuclear fuel, comprising:

(a) treating an organic extraction phase, containing fission materials uranium and plutonium as well as containing a partial amount (A) of fission- and corrosion products, from an extraction step of the reprocessing process, with an aqueous, basic, carbonate ion containing solution, whereby the fission materials and at least a part of (A) are stripped into the aqueous solution to form an aqueous phase containing uranium in the form of uranium carbonato-complex, (b) separating the organic phase from the aqueous phase, (c) removing plutonium from the separated aqueous phase, (d) adjusting the aqueous solution resulting from step (c) and containing the uranium-carbonato-complex and a small residual amount (C) of fission products to a molar ratio of uranyl ion concentration to carbonate ion concentration or $CO_3^{--}/HCO_3^-$ concentration of 1 ($UO_2^{++}$) to at least 4.5($CO_3^{--}$, or $CO_3^{--}/HCO_3^-$), at a maximum U-concentration of not more than 60 g/l, (e) leading the adjusted solution over a basic anion exchanger made from a polyalkene matrix provided with a preponderant part tertiary and a minor part quaternary amino groups to adsorb fission product ions or fission products containing ions, and (f) recovering the unadsorbed uranyl-carbonato complex which is decontaminated and preponderantly fission product free by separating the uranium containing, remaining aqueous solution from the ion exchanger.

The partial amount (A) of fission- and corrosion products is usually between 0.5 to 2% of the original amount in the fuel solution before the extraction of U and Pu into the organic phase. The part of (A) which will be stripped into the aqueous carbonate ions containing solution lies between 0.5 to 0.9 of (A).

The present invention also provides a process for the recovery of the uranium values in an extractive reprocessing for irradiated nuclear fuels, comprising (a) treating an organic extraction phase, containing fission materials uranium and plutonium, as well as containing a minor amount of fission- and corrosion products, from a purification step of the reprocessing process, with an aqueous, basic, carbonate ion containing solution, whereby the fission materials and at least a part of said fission- and corrosion products are stripped into the aqueous solution to form an aqueous phase containing uranium in the form of uranium carbonato-complex, (b) separating the organic phase from the aqueous phase, (c) removing plutonium from the separated aqueous phase, (d) adjusting the aqueous solution resulting from step (c) and containing uranium-carbonato-complex and a small residual amount of fission products to a molar ratio of uranyl ion concentration to carbonate ion-concentration or $CO_3^{--}/HCO_3^-$ concentration of 1 ($UO_2^{++}$) to at least 4.5($CO_3^{--}$, or $CO_3^{--}/HCO_3^-$), at a maximum U-concentration of not more than 60 g/l, (e) leading the adjusted solution over a basic anion exchanger made from a polyalkene matrix provided with a preponderant part tertiary and a minor part quaternary amino groups to absorb fission product ions or fission products containing ions, and (f) recovering the unadsorbed uranyl-carbonato complex which is decontaminated and is preponderantly fission product free, be separating the uranium containing, remaining aqueous solution from the ion exchanger.

The said organic extraction phase in step (a) can be an organic liquid as well as a solid material, for example consisting of a solid adsorption material with an adsorbed extraction agent.

The aqueous, basic, carbonate ion containing solution with which the organic phase is treated in process step (a), can be a maximum of 2.5 molar in $CO_3^{--}$ ions. However, in addition to $CO_3^{--}$ ions, it can contain also $HCO_3^-$ ions in a maximum amount of about 1 mol/l. Usable stripping solutions of this type have a pH value of from pH 5 to pH 11.

The separation of plutonium in step (c) can occur, for example, by allowing the solution to stand or by heating the solution, whereby plutonium oxide hydrate and a partial amount of "B" (B<A) of the fission products, etc., precipitate, and subsequent filtration or centrifuging takes place. According to the amount of plutonium precipitate an amount of fission products, etc., between 20 an 95% of the stripped amount of fission products, etc., can coprecipitate with the plutonium.

Possibly, during the exposure of uranium in the nuclear reactor, the neptunium formed follows the path of the uranium in the process according to the present invention.

In a preferred embodiment of the process according to the present invention, the aqueous solution resulting from step (c) is adjusted in step (d) to a molar ratio of uranyl ion concentration to carbonate ion concentration or to carbonate ion/hydrogen carbonate ion concentration of 1:5 to 1:8. The aqueous solution resulting form step (c) is advantageously adjusted at a uranium concentration of 60 g/l to a molar ratio of $UO_2^{++}$ concentration to $CO_3^{--}/HCO_3^-$ concentration of 1:5.

If the $UO_2^{++}$ concentration in the solution is low (for example less than 0.1 g/l) the $UO_2^{++}/CO_3^{--}$ or $UO_2^{++}/CO_3^{--}HCO_3^-$ ratio can be markedly more than 1:8 (for example 1:15). If the $UO_2^{++}$ amount is about 60 g/l the maximum possible ratio of $UO_2^{++}/CO_3^{--}$ or $UO_2^{++}/CO_3^{--}HCO_3^-$ can be quite near 1:8. If the carbonate concentration is higher then the solubility of the uranyltricarbonate complex will be markedly reduced and the complex will precipitate.

A basic anion exchanger such as one comprising a polyalkene-epoxy-polyamine with tertiary and quaternary amino groups of the chemical structure $R-N^+(CH_3)_2Cl^-$ and $R-N^+(CH_3)_2(C_2H_4OH)Cl^-$ preferably is used, wherein R represents the molecule without amino groups.

Advantageously, the aqueous solution produced in step (d) and employed in step (e) has a hydrogen carbonate ion concentration between 0 and 1 mol/l. The $CO_3^{--}$ concentration in the aqueous solution, produced in step (d) and employed in step (e) preferably amounts to a maximum of 2.5 m/l and the pH value of the aqueous solution produced in step (d) and employed in step (e) preferably is in the range of pH 7 to pH 11.

The process according to the present invention can also be carried out in the absence of $HCO_3^-$ ions, yet the process conditions can more easily be adjusted when $HCO_3^-$ ions are present in the adjusted aqueous solution.

DETAILED DESCRIPTION OF THE INVENTION

The range of application of the process of the present invention spans a large variation in concentration of the uranium stream to be decontaminated. When the uranium concentration in the solution is very small compared to the carbonate concentration, so that for example a free $CO_3^{--}/HCO_3^-$ concentration higher than 0.6 mol/l is present, then for optimizing the fission product recovery, restriction of the too large carbonate excess can be accomplished either by metered addition of a mineral acid, preferably $HNO_3$, to destroy carbonate ions, or by addition of, for example $Ca(OH)_2$, whereby a certain amount of carbonate ions are removed.

However, in the reverse case, that is, when higher uranium concentrations are present, then, with the addition of sufficient amounts of $CO_3^{--}/HCO_3^-$ ions, the uranium distribution coefficient must be minimized so that the fission product species are not displaced by the uranium from the ion exchanger. The desired separations can still be conducted at uranium concentrations of about 60 g U/l. The limitation of the process of higher U concentrations is based on the solubility of uranium in carbonate-hydrogen carbonate solutions. The lowest practical concentration of $UO_2^{++}$ in the solution is in the same range as the $UO_2^{++}$ concentration in sea water.

Indeed, a process for the separation of actinide ions from aqueous, basic, carbonate containing solutions is known from German Published Patent Application No. 31 44 974 and corresponding U.S. Pat. No. 4,460,547, in which the actinide ions are adsorbed in basic ion exchangers as carbonato complexes, and after separation of the charged ion exchanger from the original solution by means of an aqueous solution, are again desorbed from the ion exchanger and further processed. In the process described in German Published Patent Application No. 31 44 974 and U.S. Pat. No. 4,460,547 the basic anion exchanger for the adsorption of the actinide ions is a polyalkene matrix provided with a preponderant part of tertiary and a minor part of quaternary amino groups, yet this process can only rationally be used on aqueous, carbonate containing waste solutions or wash solutions, etc. For corresponding solutions with a relatively high content of uranyl ions, the expenditure for equipment would become too high and the exact maintenance of the carbonate ion-concentrations in the range of the molar ratio $UO_2^{++}$ concentration to $CO_3^{--}$ concentrations between 1:3 and 1:4 can be problematic in some cases. Moreover, the process according to German Published Patent Application No. 31 44 974 and U.S. Pat. No. 4,460,547 is too complicated for larger uranium concentrations in the solution, because the uranyl ions, in contrast to the process according to the present invention, are adsorbed by the anion exchanger, whereby the fission product ions run through the ion exchanger with the remaining solution and the uranium must again be eluted from the ion exchanger. Moreover, in the process according to the present invention, the uranyl ions are not firmly attached by the same anion exchanger method, but rather only the still present fission product species.

The essential advantages of the process according to the present invention reside in the facts (1) that the decontamination of the uranium from the fission products still present can be conducted with a relatively small amount of anion exchanger, for example in a relatively small ion exchanger column, (2) that the ion exchanger charged with the fission product (with or without column) can be given directly to the waste-treatment and -removal without intermediate treatment. By repeating the process according to the present invention one or several times on additional small anion exchanger batches, a high degree of purity of the uranium to be recovered is achieved.

Because the process according to the present invention can be conducted quickly, the formation of degradation products of the extraction agent or of the dilution agent, which is disadvantageous in the extraction process, is avoided in the cycle of recovery and recycling of uranium into nuclear fuel. The process according to the present invention is characterized by being conducted very safely. For example, in no phase of the process must the organic anion exchanger be brought into contact with corrosive or strong oxidizing agents.

The process according to the present invention works with basic media, which offer the highest possible insurance against release of volatile iodine components. The adjusted solution used in the process according to the present invention, which can contain up to maximum 2.5 mol/l $Na_2CO_3$ and at lower $CO_3^=$ concentrations up to about 1 mol/l $NaHCO_3$, is chemically simple to control and radiochemically resistant. Corrosion problems do not exist. Moreover, the expenditure on chemicals, equipment and work time is very low in the process according to the invention.

The basic anion exchanger which can be used in the practice of the present invention preferably is comprised of a polyalkene epoxy polyamine with tertiary and quaternary amino groups having the chemical composition:

$R-N^+(CH_3)_2Cl^-$ and $R-N^+(CH_3)_2(C_2H_4OH)Cl^-$ (the chloride can be replaced for example by nitrate or carbonate) where R represents the polyalkene epoxy portion, and known under the tradename Bio-Rex 5, made by Bio-Rad Laboratories, Richmond, Calif., U.S.A. For all practical purposes there are no other functional groups. The matrix is all one epoxy polymer. The polyalkene matrix preferably is provided in the majority (more than 50% of the total number of amino groups) with tertiary and in the minority with quaternary amino groups. The ratio of tertiary to quaternary amino groups on the polyalkene matrix of the basic anion exchanger preferably is ten to one, respectively.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE

In two dynamic column flow experiments, at different uranium to carbonate/hydrogen carbonate ratios, the effectiveness of the process according to the present invention was investigated.

The average fission product hold back by the ion exchanger with a column flow under the given load conditions was >97% for cerium, zirconium and niobium; for ruthenium the hold back by the ion exchanger was about 80%.

In the following the conditions and results are given individually for each experiment:
Results:
Volume of feed solution being treated: 100 ml
U-Content: 1.19 g

| Molar Ratio of | Experiment 1 | Experiment 2 |
|---|---|---|
| U: $CO_3^{--}$/$HCO_3^-$: | 1:7 | 1:6 |
| $Na_2CO_3$: | 3.24 g = 90 mol % | 2.78 g = 90 mol % |
| $NaHCO_3$: | 0.28 g = 10 mol % | 0.24 g = 10 mol % |
| Column | | |
| Diameter | 15 mm | |
| Height | 130 mm | |
| Bed Volume | 20 ml | |
| Feed Rate | 0.5 ml/cm$^2$ · sec. | |
| After treatment (wash) solution | 0.2 molar $Na_2CO_3$-solution | |
| Number of Washes | 4 washes, with each wash being conducted with 20 ml of wash solution | |

In place of a $Na_2CO_3$ aftertreatment wash solution, also another corresponding alkali- or ammonium-carbonate solution can be used.

Ion exchanger:
Moderate basic anion exchanger made from polyalkene-epoxy-polyamine with tertiary and quaternary amino groups with the trade name Bio-Rex 5 (from the firm Bio-Rad Laboratories, USA).

| Experiment 1 % of Value in Solution That Passed Through Ion Exchanger | | | | | |
|---|---|---|---|---|---|
| | Uranium | Cerium | Ruthenium | Zirconium | Niobium |
| 100 ml Feed | 81.7 | 1.66 | 13.43 | 1.36 | 1.06 |

-continued

Experiment 1
% of Value in Solution That Passed Through Ion Exchanger

|  | Uranium | Cerium | Ruthenium | Zirconium | Niobium |
|---|---|---|---|---|---|
| Solution 20 ml Wash Solution 1 | 14.8 | 0.32 | 4.06 | 0.26 | 0.19 |
| 20 ml Wash Solution 2 | 2.1 | 0.27 | 1.31 | 0.18 | 0.13 |
| 20 ml Wash Solution 3 | 0.8 | 0.14 | 0.55 | 0.09 | 0.06 |
| 20 ml Wash Solution 4 | 0.4 | 0.10 | 0.29 | 0.07 | 0.05 |
| Total | 99.8 | 2.49 | 19.64 | 1.96 | 1.49 |

Experiment 2
% of Value in Solution That Passed Through Ion Exchanger

|  | Uranium | Cerium | Ruthenium | Zirconium | Niobium |
|---|---|---|---|---|---|
| 100 ml Feed Solution | 80.5 | 1.84 | 13.51 | 1.38 | 1.31 |
| 20 ml Wash Solution 1 | 15.0 | 0.35 | 4.20 | 0.27 | 0.22 |
| 20 ml Wash Solution 2 | 2.6 | 0.25 | 1.20 | 0.24 | 0.16 |
| 20 ml Wash Solution 3 | 1.0 | 0.15 | 0.43 | 0.08 | 0.06 |
| 20 ml Wash Solution 4 | 0.6 | 0.10 | 0.31 | 0.06 | 0.05 |
| Total | 99.7 | 2.69 | 19.65 | 2.03 | 1.80 |

It will be understood that the above description of the present invention is susceptible to various modifications, changes and adaptations, and the same are intended to be comprehended within the meaning and range of equivalents of the appended claims.

What is claimed is:

1. An extractive reprocessing process for recovering uranium values from irradiated nuclear fuels, in which an organic extraction agent is employed to extract uranium and plutonium from an aqueous solution and form an organic extraction phase, containing an organic extraction agent, comprising
   (a) treating the organic extraction phase, containing fission materials comprised of uranium and plutonium, as well as containing a minor amount (A) of fission- and corrosion products, from an extraction step of the reprocessing process, with an aqueous, basic, carbonate ion containing solution, whereby the fission materials and at least a part of the fission- and corrosion-products are stripped into the aqueous solution to form an aqueous phase containing uranium in the form of uranium carbonato-complex,
   (b) separating the organic phase from the aqueous phase,
   (c) removing plutonium from the separated aqueous phase,
   (d) adjusting the aqueous solution resulting from step (c) and containing uranium-carbonato-complex and a small residual amount (C) of fission products to a molar ratio of uranyl ion concentration to carbonate ion-concentration or $CO_3^{--}/HCO_3^-$ concentration of 1 ($UO_2^{++}$) to at least 4.5($CO_3^{--}$, or $CO_3^{--}/HCO_3^-$), at a maximum U-concentration of not more than 60 g/l.,
   (e) leading the adjusted solution over a basic anion exchanger made from a polyalkene matrix provided with a preponderant part tertiary and a minor part quaternary amino groups to adsorb fission product ions or fission products containing ions, and
   (f) recovering the unadsorbed uranyl-carbonato complex which is decontaminated and is preponderantly fission product free, by separating the uranium containing, remaining aqueous solution from the ion exchanger.

2. Process according to claim 1, wherein the aqueous solution resulting from step (c) is adjusted to a molar ratio of uranyl ion concentration to carbonate ion/hydrogen carbonate ion concentration of 1:5 to 1:8.

3. Process according to claim 1, wherein the aqueous solution resulting from step (c) is adjusted at a U concentration of 60 g/l to a molar ratio of $UO_2^{++}$ concentration to $CO_3^{--}/HCO_3^-$ concentration of 1:5.

4. Process according to claim 1, wherein the basic anion exchanger is a polyalkene-epoxy-polyamine with tertiary and quaternary amino groups of the chemical structure $R-N^+(CH_3)_2Cl^-$ and $R-N^+(CH_3)_2(C_2H_4OH)Cl^-$, wherein R represents the molecule without amino groups.

5. Process according to claim 1, wherein the aqueous solution produced in step (d) and employed in step (e) has a hydrogen carbonate ion concentration between 0 and 1 mol/l.

6. Process according to claim 1, wherein the $CO_3^{--}$ concentration in the aqueous solution produced in step (d) and employed in step (e) amounts to a maximum of 2.5 m/l.

7. Process according to claim 1, wherein the pH value of the aqueous solution produced in step (d) and employed in step (e) is in the range of pH 7 to pH 11.

8. An extractive reprocessing process for recovering uranium values from irradiated nuclear fuels, in which an organic extraction agent is employed to extract uranium and plutonium from an aqueous solution and form an organic extraction phase, comprising
   (a) treating an organic extraction phase, containing fission materials uranium and plutonium, as well as containing a minor amount of fission- and corrosion products, from a purification step of the reprocessing process, with an aqueous, basic, carbonate ion containing solution, whereby the fission materials and at least a part of said fission- and corrosion products are stripped into the aqueous solution to form an aqueous phase containing uranium in the form of uranium carbonato-complex,
   (b) separating the organic phase from the aqueous phase,
   (c) removing plutonium from the separated aqueous phase,
   (d) adjusting the aqueous solution resulting from step (c) and containing uranium-carbonato-complex and a small residual amount of fission products to a molar ratio of uranyl ion concentration to carbonate ion-concentration or $CO_3^{--}/HCO_3^-$ concentration of 1 ($UO_2^{++}$) to at least 4.5($CO_3^{--}$, or $CO_3^{--}/HCO_3^-$), at a maximum U-concentration of not more than 60 g/l,
   (e) leading the adjusted solution over a basic anion exchanger made from a polyalkene matrix provided with a preponderant part tertiary and a minor part quaternary amino groups to adsorb fission product ions or fission products containing ions, and
   (f) recovering the unadsorbed uranyl-carbonato complex which is decontaminated and is preponderantly fission product free, be separating the uranium containing, remaining aqueous solution from the ion exchanger.

* * * * *